Jan. 22, 1957

J. MULLER

2,778,391

COUPLING WITH CUT-OFF DEVICE FOR COUPLING PIPEWAYS WITH
PIPES OR OUTLETS OF TANKS AND OTHER RECEIVERS

Filed Feb. 5, 1954

INVENTOR

JACQUES MULLER

BY Young, Emery & Thompson

ATTYS.

United States Patent Office 2,778,391
Patented Jan. 22, 1957

2,778,391

COUPLING WITH CUT-OFF DEVICE FOR COUPLING PIPEWAYS WITH PIPES OR OUTLETS OF TANKS AND OTHER RECEIVERS

Jacques Muller, La Garenne-Colombes, France

Application February 5, 1954, Serial No. 408,529

Claims priority, application France February 13, 1953

10 Claims. (Cl. 141—349)

The present invention relates to a coupling with a cut-off device, for coupling pipeways with the pipes or connectors of tanks, reservoirs and other receivers, co-operating with a remote closure device. It is more particularly concerned with a coupling intended to be coupled to pipes or inlets of tanks or reservoirs and comprising the device for limiting the filling of receivers and with automatic closure.

The coupling according to the invention is particularly intended to be coupled to a tubular inlet having externally a series of radial claws or a truncated conical slope or other gripper means.

To this end and by way of example the forward end of the coupling which is to be applied in a fluid tight manner to the inlet orifice comprises a coupling device with axial clamping arranged in such a way that the coupling may be engaged axially on the "hooked" fitting to the claws thereof by a partial turn and fixed by the operation of a handle adapted to effect an axial clamping.

The coupling case which is substantially cylindrical is extended towards its rear end to a lateral inlet pipeway for the liquid which pipeway is intended to be connected to a flexible feed pipe.

An important object of the invention is to obtain the opening and closing of the coupling device with axial clamping, by relative axial displacement of the coupling case and a sleeve mounted to slide on the forward part of the case by means of a stirrup.

Another object of the invention is to provide the coupling with a control mechanism for the cut-off device and the retaining valve of the inlet connection operable by means of a single handle.

A further object of the invention is to provide the coupling with a locking device for the handle of the cut-off device. This locking device is designed in such a way that one cannot accidentally open the cut-off device of the coupling as long as the coupling device has not been closed and clamped to the inlet, nor can the coupling device be open and withdrawn from the inlet connection as long as the cut-off device has not been closed as well as the valve of the outlet.

Any accidental operation of the handle of the coupling device in the sense of closure thereof is prevented by a device which retains the coupling handle automatically at the end of each opening operation.

In fact the closure of the coupling device brings the locking device to the position in which the handle of the cut-off device is freed and can thus be operated in the sense of opening the cut-off device. It being understood that the rigid device opposes accidental or inadvertent closure, the operator must first release the catch to be able to close the coupling device and then to open the cut-off device.

A still further object of the invention is to provide an electric, hydraulic or other mechanism which automatically effects the closure of the cut-off device of the coupling when the liquid fed to the tank or reservoir or contained therein reaches the given level.

Other features of the invention will be apparent from the following description with reference to the attached drawings which show by way of example several constructional embodiments.

The coupling according to the invention comprises a tubular case 10 having a shoulder 11 at the forward end intended to be coupled to a pipe or connector fitting 12 associated with a reservoir or tank. Beyond this shoulder the case is extended to the forward extremity by an annular rim 13. On this rim and making a tight friction fit therewith is fitted a socket 14 provided with a peripheral flange 15 secured by several screws to the shoulder 11. The length of the socket 14 is so chosen that its free edge comes level with the free end of the rim 13. A shoulder 16 is formed in the side of the rim 13 while the socket 14 is provided internally with a peripheral rib 17 opposite the said shoulder. The proportions and the shape of these elements are so chosen that an annular groove is formed in which is held a sealing ring 18 which is clamped against an internal shoulder of the pipe or connector fitting 12 when the coupling is fitted to the latter. The rim embodies internally a conical seat 19 the purpose of which will be defined below.

On the forward cylindrical part of the case is a sleeve 20 adapted to slide and to rotate on the case; and in the outer periphery of the sleeve a groove 21 is provided near the lower edge thereof whilst on the forward end is a relatively broad peripheral groove 22 containing a rubber ring 22'. The purpose of the latter is simply to protect the forward end of the sleeve against mechanical damage. Near the said end of the sleeve is a re-entrant rim 23 which extends radially into the annular space formed between the sleeve and the outer periphery of the socket 14. Several slots 24 (see Fig. 4) are cut radially in the rim 23.

Figures 1, 2:
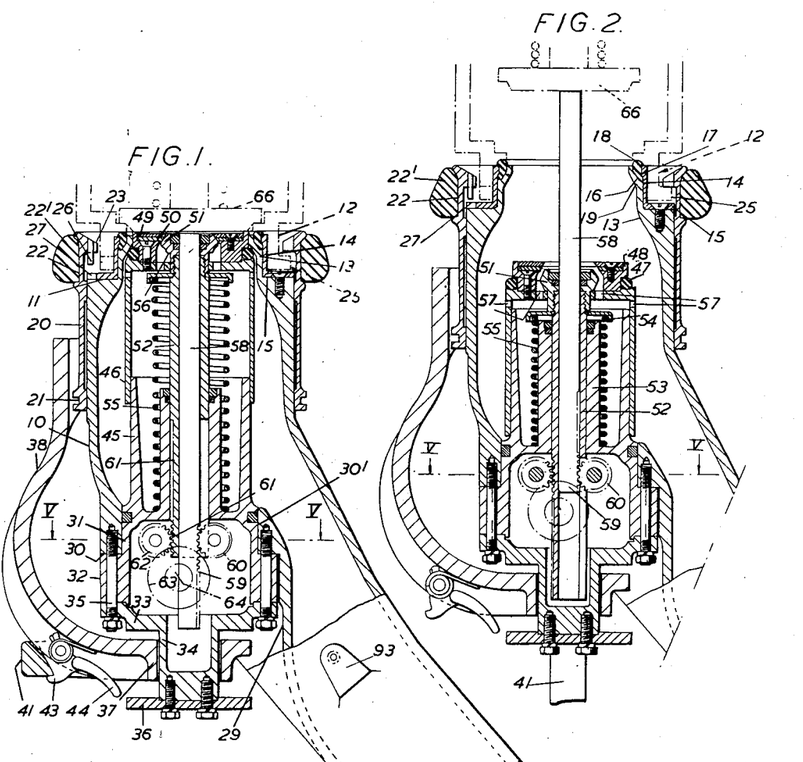
Fig. 1 is a view mainly in section of the coupling on the line I—I of Fig. 4, and shows the position of the parts after the closure of the cut-off device and the opening of the coupling device.
Fig. 2 is a substantially similar view but shows the position of the members after the closure of the coupling device and the opening of the cut-off device.

The pipe or connector fitting 12 shown diagrammatically in Figs. 1 and 2 which forms no part of the present invention and which may have various forms, is designed in such a way that it embraces the rim 13 while fitting axially into the annular space between the sleeve 20 and the socket 14. This connector fitting is provided in known manner with radial claws 25 (Figs. 1 and 2) on the outer periphery and at the free end, said claws being so proportioned that they may pass into the slots 24 in the rim 23 of sleeve 20.

The parts described hereinafter form part of the coupling device. The fitting of the connector is effected in the usual manner. As has been indicated before the coupling device is open (condition shown on Fig. 1) as long as the coupling has not been placed on the connector 12. The operator fits the rim 13 with the socket 14 to the connector and arranges the sleeve 20 angularly in such a way that the claws 25 of the fitting may pass through the slots 24 and enter the space below this rim.

The operator, after locating the claws in the said space, turns the sleeve 20 in one direction or the other in relation to the case to cause the claws to pass beneath the sectors of the rim. Lugs 26 serve as abutments for limiting the turning of the sleeve 20. Thus the coupling is "hooked" on to the connector. The operator may then close the coupling device (condition indicated in Fig. 2) by means of the device described below in such a way as to clamp the sectors of the rim 23 against the claws 25. This has for its effect to clamp the rim 13 with the packing ring 18 against the internal shoulder of the connector fitting 12. The socket 14 has slots 27 opposite the lugs 26 permitting the said socket to be withdrawn vertically for changing the sealing ring 18.

The case 10 is extended towards the rear end by an oblique tubular part 28 and the bent wall between the case and the tubular part embodies on the outer side a cavity 29 the base of which is machined to form a flat seat 30, perpendicular to the axis of the forward part of the case. Within the base concentric with the axis is a bore 30'. In the bore is fitted a cylindrical gear box 31 provided with a peripheral flange 32 fitting against the seat 30. This box is close on the opposite side to the seat by a cover 33 extended axially towards the outside by a central cylindrical stem 34. The case, the gear box and the cover are secured together by means of studs 35. To the end of the stem 34 is fixed an abutment ring 36 perpendicular to the axis. On the stem 34 is fitted a collar 37 forming one end of a stirrup lever 38 the opposite end of which is divided into two limbs 39 (Fig. 3) embracing the sleeve 20 and pivoted thereto at two diagrammatically opposite points 39'. The collar 37 has two co-axial diametrally opposed pivot pins 40 the common axis of which is perpendicular to the plane of the stirrup lever and to which are articulated the side members of a rectangular stirrup shaped handle 41. This handle is rigid with a symmetrical cam 42 located between the cover 33 and the abutment ring 36. The cam is shaped so that its periphery is always in contact with the cover and the abutment ring whatever its angular position. It is disposed angularly in such a way that lowering of the handle 41 from the position indicated in Figs. 1 and 3 towards the position shown in Fig. 2 causes it by thrusting against the cover 33, to lower the pivot pins 40 and, therefore, the stirrup 38 and the sleeve 20 in relation to the case 10. This movement of the handle serves to close the coupling device—in a manner which will be more fully described hereinafter. Inversely lifting of the handle starting from the position indicated in Fig. 2 towards the position shown in Figs. 1 and 3 causes the cam to thrust against the abutment ring 36 so that the coupling pins 40 approach tthe cover 33 and so lift the stirrup 38 and the sleeve 20 to open the coupling device.

It is necessary to provide a device for preventing the handle 41 from turning down on its own and causing the sleeve 20 to move in the closure direction of the coupling device. To this end the stirrup 38 carries at the base a spring actuated pivoted pawl 43 the catch of which engages automatically below the lower face of the yoke of the handle 41 when the latter is in the position shown in Figs. 1 and 3. This pawl is provided with a tail piece 44 which the operator depresses after "hooking" the coupling on to the connector. The operator proceeds as follows. He holds the tubular part 28 in one hand the stirrup 38 with the other to fit the coupling device on the connector fitting 12 in the manner above described. He rotates the sleeve 20, for example by means of the stirrup 38, releases the pawl 43 and depresses the handle 41 to close and secure the coupling device. All is now ready for obtaining communication from the container to the pipeway.

Figure 5:
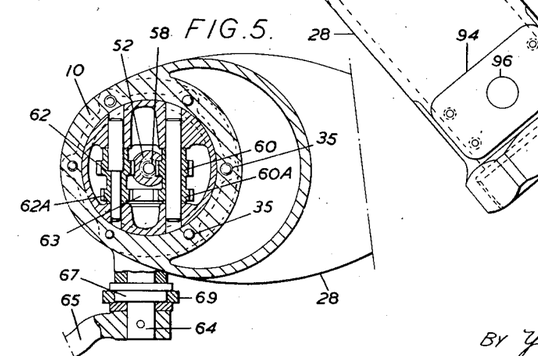
Fig. 5 is a section on the line V—V of Fig. 1.

The gear box 31 carries a cylindrical tube 45 entering the inside of the case 10 in the direction of the seat 19, said tube 45 being co-axial with the case 10; and a guide skirt 46 depending from the cut-off device about to be described is slidably mounted on this tube. The cut-off device comprises a piston valve and a pilot valve. The skirt 46 of the piston of the piston valve has a groove near its forward peripheral edge in which groove is fitted an annular sealing ring 47 secured by an annular cap 48 fixed to the forward end of the piston by several screws. This cap is so proportioned as to enter smoothly into the opening of the rim 13 while the sealing ring 47 projects sufficiently from the outer periphery to enable it to co-operate with the seat 19 when the piston is in the closed position (Fig. 1). An annular sealing ring 49 rests on the forward end of the cap, the inner edge of said ring projecting inwards slightly beyond the inner periphery of the cap 48 and being clamped and held by an annular disc 50 secured to the base of the cap by screws. This assembly in conjunction with the seat 19 constitutes the piston valve. The pilot valve comprises an annular head 51 screwed or otherwise fixed to the forward end of a tubular rod 52 located co-axially of the case 10 and slidable in a tubular guide 53 extending upwards from the gear box 31. The pilot valve head arranged in this way may thus co-operate with the sealing ring 49. The head 51 holds a cup 54 rigidly on the tubular rod 52. Between the cup and the base of the annular space between the elements 45 and 53 is fitted a helical compression spring 55 tending to seat the members 47 and 51, i. e., to close the piston and pilot valves. The head 51 also has, at its base, a shoulder 56 intended to co-operate with the head of the piston of the piston valve (Fig. 2) and spaced from this head in the closed position of the pilot valve (Fig. 1). In the head of the piston and in the skirt 46 are cut orifices 57 intended to provide communication between the space bounded by the piston and the tube 45, which is a variable volume space, and the interior of the case 10. In the head 51 of the pilot valve and in its tubular rod 52 there is located in fluidtight sliding manner a central rod 58 at the rear part of which is cut a rack 59 engaging a pinion 60 mounted to rotate on a transverse spindle fitted to two opposite sides of the gear box 31. The tubular rod 52 has on the outer periphery, at the rear part, a rack 61 engaging a pinion 62 mounted to rotate on a transverse spindle parallel to that of the pinion 60 and diametrically opposite the latter in relation to the axis of the case 10. The pinions 60 and 62 are respectively rigid with two pinions 60A and 62A (Fig. 5) to provide for different settings of the central rod 58 and of the tubular rod 52. The two pinions 60A and 62A commonly mesh with a pinion 63 rigid with one end of a shaft 64 mounted to rotate in a boss in one lateral wall of the case 31 and projecting therefrom on one side. At the outer end of the shaft 64 is fixed an external handle 65. The said handle may, for example, be arranged on the same side of the case 10 as the handle 41.

Figures 3, 4:
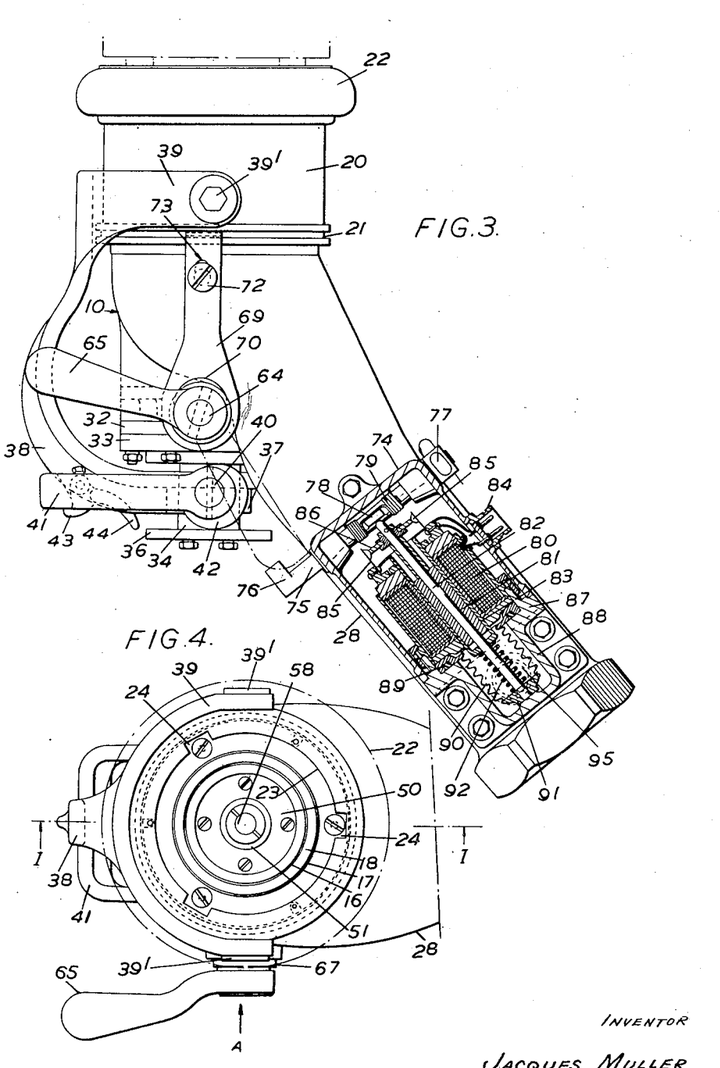
Fig. 3 is a side elevation of the coupling in the direction of the arrow A of Fig. 4, and shows also in section the automatic closure device of the cut-off device secured to the tubular coupling member for fitting to a flexible feed pipe.
Fig. 4 is a plan view of the coupling.

The arrangement of the parts is such that when the handle 65 occupies the position indicated in full lines in Fig. 3, the piston valve and the pilot valve are closed while the forward end of the rod 58 is concealed within the head 51 of the pilot valve. The valve head 66 of the connector fitting is applied against its seat by its own spring. When the operator, having applied the coupling to the connector as shown in Fig. 2, depresses the handle 65 towards the position indicated in chain lines in Figs. 3 and 7 first the head 51 of the pilot valve is moved from its seat 49 and at the same time the central rod 58 is moved upwards and thus commences to open the valve 66 of the connector fitting 12. As the pilot valve offers a smaller surface to the pressure of the liquid contained in the case 10 and the skirt 46 the pilot valve can open more easily than the piston valve. Opening of the pilot valve permits balancing of the pressures on the two sides of the piston valve through the communication provided through the orifices 57 so that the piston valve is then allowed to open without difficulty. The piston is of course moved by reason of the fact that the shoulder 56 of the head 51 presses against the head of the said piston. The assembly comprising the piston and pilot valve head then moves towards the position shown in Fig. 2, compressing the spring 55, while the central rod 58 completely opens the valve 66 of the connector fitting 12 (Fig. 2). The passageway between the connector and the inside of the container is thus largely freed so long as the handle 65 is depressed.

For closing the valves it is sufficient for the operator to release the handle 65. The spring 55 then lifts the head 51 and the tubular rod 52 by means of the cap 54 and so applies the head to the seat 49; and this head, by co-operation with the final pressure of the piston valve in turn applies the piston of the piston valve against its seat 19 at the same time as the central rod 58 is moved in the return direction through the transmission mechanism 61, 62, 62A, 63, 60, 60A, 59 and thus permits the closure of the valve 66 under the action of its associated spring.

As has been stated above it is essential to provide a locking device arranged in such a way that an operator cannot accidentally open the cut-off valve of the coupling as long as the coupling has not been closed and clamped to the outlet fitting nor can the coupling be opened and the connector withdrawn from the fitting as long as the cut-off valve and the lift valve of the fitting have not been closed. This locking device will be described below with reference to Figs. 6 and 7.

Externally of the gear box 31 a pivot 64 carries a ring 67 which rotates rigidly therewith and in the outer periphery of which is cut a notch 68. The ring is fixed angularly in relation to the handle 65 in such a way that the notch is on the far side of the pivot 64 in relation to the sleeve 20 when the said handle is in the position shown in Fig. 6 and in full lines on Fig. 3, that is to say when all the valves are closed. One end of the connector plate 69 is fitted freely on the ring by means of a longitudinal slot 70 having on the side furthest from the sleeve 20 a lug 71 adapted releasably to engage with the notch 68. The difference between the length of the slide 70 and the height of the lug 71 is equal to the outer diameter of the ring 67. The opposite end of the connector plate 69 is cranked and the projection thus formed is in engagement with the groove 21 of the sleeve 20. Axial guiding of the connector is ensured by a screw 72 rigid with the case 10 in engagement with a longitudinal slideway 73 in the connector plate.

Figures 6, 7, 13:
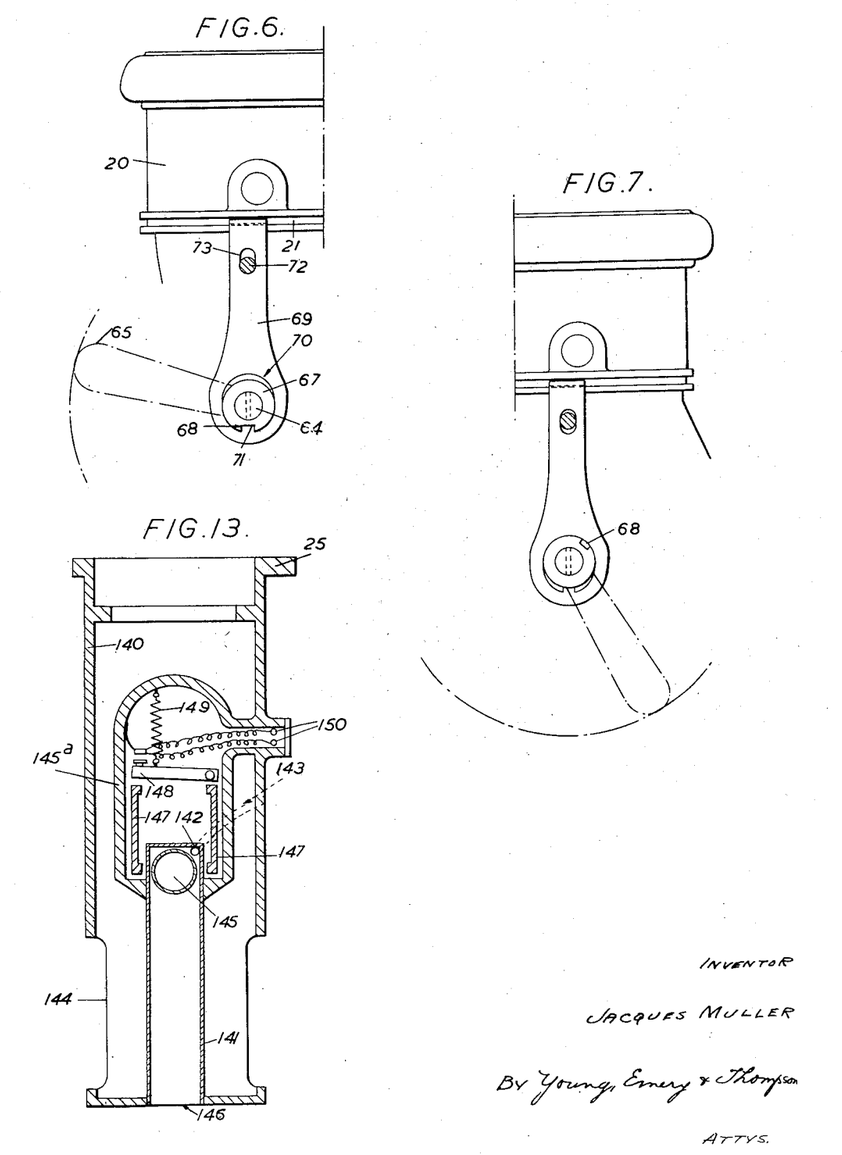
Figs. 6 and 7 are partial views taken in the direction of the arrow A of Fig. 4 showing separately the locking device respectively in the two working positions.
Fig. 13 shows in axial section another method of constructing the electric control device.

It will be seen that the lug 71 can only engage the notch 68 after the latter is brought opposite the former; that is to say as soon as the handle 65 has reached the position shown in Fig. 6. The operator can thus effect the withdrawal or advance of the sleeve 20 so as to close or to open the coupling device. However, when the coupling device is open the operator can no longer work the handle 65 since the latter is locked from rotation by the lug 71 engaged in the notch 68. After the operator closes the coupling device, pulling back the sleeve 20 by depression of the handle 41 he also depresses the connector plate 69 and thus disengages the lug 71 from the notch 68. As soon as the handle is turned towards the position shown in Fig. 7 to open the pilot valve and the piston valve in the fitting, the notch 68 is no longer opposite the lug 71. Since the difference between the length of the slide 70 and the height of the lug 71 is exactly equal to the outer diameter of the ring 67, the connector plate 69 can no longer be moved laterally and secondly locks the sleeve 20. It is thus not possible to open the coupling device whilst the valves are open. It has been shown above that the closure of the piston and pilot valves is effected by the action of the spring 55 and of the pressure as soon as the operator releases the handle 65. In order to relieve the operator of the necessity of holding the handle 65 in the depressed position (shown in chain dot lines in Fig. 3) during the whole of a filling operation of a tank, for example, it is desirable to provide means for retaining the handle in its depressed position and for releasing it automatically or through the intervention of the operator as soon as the liquid reaches the desired level in the tank. Such a means, shown in section at the base of Fig. 3, is mounted in a housing 74 fixed laterally to the pipe 28 on the side adjacent the handle 65.

In the upper part of the housing 74 is rotatably mounted a transverse shaft 75 the ends of which extend outside the housing. The end nearest the handle 65 is provided with a catch 76 while the opposite end is provided with a handle 77. The shaft 75 internally of the houing carries a projecting arm 78 to which is fitted the central element of a double torsion spring 79, the ends of which bear against under walls of the housing. This spring tends to rotate the shaft in the direction of the arrow. On the inner face of the handle 65 is fitted a projecting plate (not shown in drawing) with an inclined surface. When the operator depresses the handle 65 to the position shown in chain line in Fig. 3 and in Fig. 7 the inclined part of the plate depresses the catch 76 against the action of the spring and finally the plate passes the catch and thus prevents the return of the handle 65 to the position shown in full lines. In order to release this handle it is sufficient for the operator to rotate the shaft 75 against the action of the spring 79 until the catch is released from the plate.

In order to obtain an automatic limitation of the filling of a tank or reservoir at a given level, for example and according to the invention, the valves may be released by the action of an electric, hydraulic or mechanical device. To this end the housing 74 contains a device which is both electric and hydraulic for releasing the handle 65 as soon as the liquid reaches a predetermined level in the reservoir. This device comprises a solenoid 80 the armature 81 of which is movable axially and is rigid with a rod 82. The rod 82 extends beyond the two ends of the solenoid and one end is adapted to co-operate with the arm 78. The armature 81 is formed as a piston mounted to slide within a cylinder 83. The solenoid should be operated in such a way that it can actuate the rod 82 in the direction of the arm 78 so as to turn the shaft 75 against the action of the torsion spring 79 until the catch 76 releases the handle 65 in the manner described.

One end of the winding of the solenoid 80 is directly connected to one of two connectors in a connector box 84 fitted to the lateral wall of the housing 74. The other end of the winding is connected to a switch formed by two axial metal plates 85 located on the two sides of the rod 82 and secured on an insulating support. The other terminal of the switch is connected to the second pin of the connector box 84. Each plate 85 carries a contact terminal on the inner side. An insulated metal disc 86 is fixed on the rod 82 between the two contacts. The arrangement is such that the disc 86 connects the contacts of the two plates 85 as long as the rod occupies the normal position shown in Fig. 3. As soon as the solenoid 80 is excited and has advanced the rod 82 to release the handle 65, the disc 86 is disengaged from the two switch contacts and the current is interrupted.

The housing 74 is closed at the end opposite the shaft 75 by a cover 87 which is extended axially by a flanged cup part 88 concentric with the solenoid axis. The solenoid is mounted on the inner face of part of the flange of the cover with the interposition of an annular ring 89 to the inner periphery of which is fixed one end of a tubular bellows 90 located in the cavity of the cupped part 88 and concentric with its axis. The opposite end of the bellows is closed by a disc 91 rigid with the adjacent end of a rod 82. A compression spring 92 is fitted between the disc 91 and the base of the cylinder 83. The housing 74 and the cover 87 are fixed to the tubular part 28 by bolts screwed into bosses on the pipe 28 having flat faces 93 and 94 (Fig. 1). The cup part 88 has a lateral orifice 95 which is placed opposite an orifice 96 in the pipe 28 communicating with the interior of the said pipe.

If the reservoir to be filled is not equipped with an electric remote control device operated by the liquid level but with a mechanical device likewise operated by a float and stopping the flow of liquid as soon as the desired level is reached, the stoppage of the liquid produces a rising pressure in the coupling which is transmitted through the orifice 95, 96 into the annular space between the cup 88 and the bellows 90. The latter is thus compressed axially and displaces the rod 82 which then acts in the manner already described on the arm 78 of the shaft 75 to release the handle 65. The electrical release of the handle 65 thus produces an increase of pressure in the coupling which has for its effect to compress the bellows 90 in the manner already described. The pressure thus holds open the contact between the contacts carried by the plates 85. This prevents re-energization of the solenoid under the action of the spring 92 and prevents vibration of the movable parts of the electro-magnet.

Figures 8, 9:
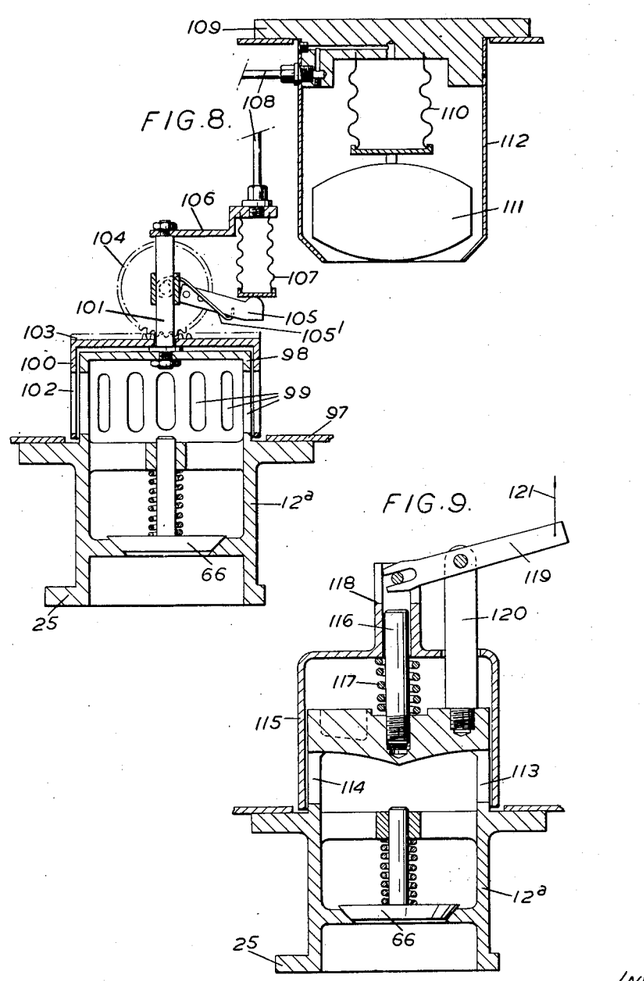
Fig. 8 is a view in axial section of a pipe or outlet with a hydraulic control device mounted in the reservoir.
Fig. 9 is a similar view of a mechanical control device mounted in the reservoir.

Figs. 8 and 9 show two embodiments of a mechanical remote control of the coupling, which are mounted on a reservoir and operated by a float.

In the example shown in Fig. 8 the pipe or fitting 12a fixed by bolts or otherwise to an opening in the base of reservoir 97, is extended upwardly by a cylindrical cage 98 having several axial slots 99 in its periphery. This cage is enclosed by a slide in the form of a cylindrical bell-shaped member 100 which is rotatably mounted on a central column 101 and has axial slots 102 in its periphery equal in number to that of the slots 99. The slide is provided with a toothed ring 103 engaging in pinion 104 mounted rotatably on the column 101 and rigid with a lever 105. The lever 101 is urged in the counterclockwise direction (on the drawing) by a spring 105'. At the top of the column 101 is fixed a lateral arm 106 running substantially in the direction of the lever 105 and on the lower face of the arm is fixed one end of a bellows 107 the opposite end of which is enclosed by a cover against which the end of the lever 105 is pressed by the spring 105'. To the arm 106 is attached a pipe 108 opening at one end into the bellows 107 and at the other end into a circular support plate 109 fixed to the top of the reservoir. The pipe communicates with passages cut in this plate and opening at the centre of the lower face of the plate. The plate at this face carries one end of a tubular bellows 110 the lower end of which is closed by a cover from which a float 111 is suspended. The bellows 110 and the float 111 are located in a cylindrical skirt 112 depending from the support 109. The bellows 107, the pipe 108, the passages and the bellows 110 are filled with liquid.

In the position shown in Fig. 8 the shut off device formed by the cage 98 and the slider 100 is open since the slots of the one part are opposite the slots of the other. If the operator actuates the shut off device of the coupling so as to open it he also opens the lift valve 66 of the connector fitting. The liquid can thus enter the receiver. As soon as it reaches float 111 it lifts the latter which has the effect of axially compressing the bellows 110. The liquid is thus forced through the pipe 108 and to the bellows 107 which expand and depress the lever 105. The pinion 104 is thus rotated in the clockwise direction (on the drawing) and the bars on the slider block the slots in the cage. If desired and as shown in Fig. 8 the bellows 110 may be differential in character which permits, for a small displacement of the level of the float 111, a much greater expansion of the bellows 107. Lowering of the level of the liquid inside the reservoir and of the float 111 returns the parts of the initial position shown in Fig. 8.

In the example shown in Fig. 9 the connector 12a is extended upwardly by a cylindrical cap 113 having apertures 114 in its periphery. This cap is enclosed by a cylindrical slider 115 with an unbroken peripheral wall mounted to slide on a central column 116 screwed to the head of the cap. Between the top of the slider and the head of the cap is interposed a compression spring 117 tending to lift the slider. The slider has an axial tubular extension 118 to which is pivoted one arm of a lever 119 mounted to fulcrum on a horizontal spindle fixed to the top of a support 120. The other arm of the lever is articulated to a connecting rod or cable 121 connected to a float not shown.

In the position shown in Fig. 9 the shut off device thus formed is closed since the slider 115 is lowered and covers the apertures 114. The reservoir is thus regarded as filled. As the latter is emptied the float falls with the liquid level, the lever 119 turns in the clockwise direction (in the drawing) and lifts the slider 115 so that the lower edge thereof progressively opens the apertures 114.

Figures 10, 11, 12:
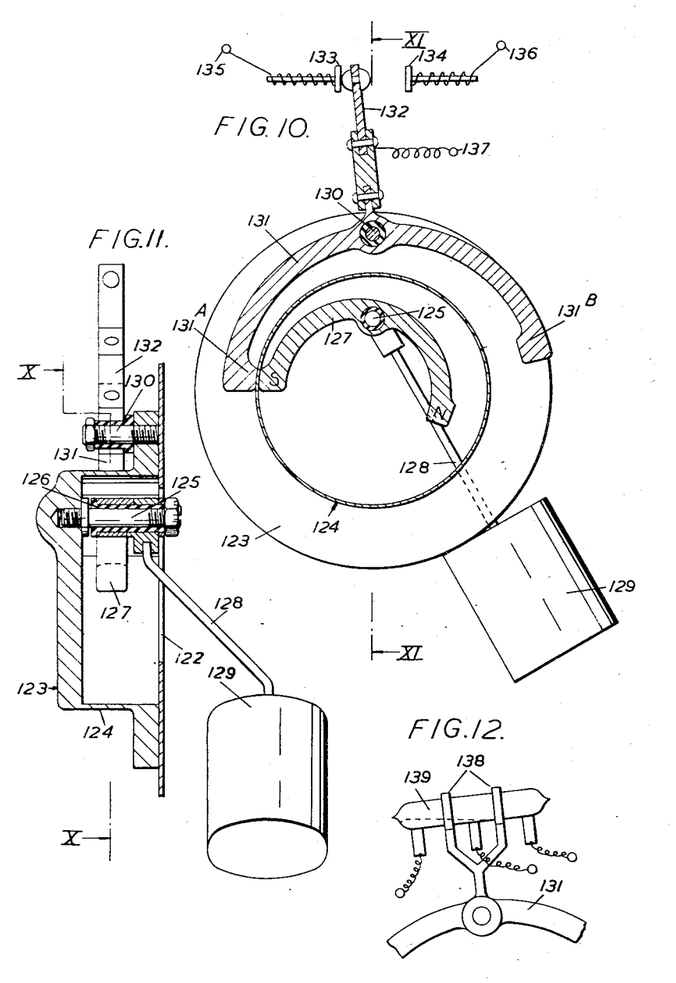
Fig. 10 is a view in section on the line X—X of Fig. 11 of a pipe or outlet with an electrical control device mounted in the reservoir.
Fig. 11 is a view in section on the line XI—XI of Fig. 10.
Fig. 12 shows a modification of this device.

Figs. 10 and 11 show an embodiment of an electric remote control device for the connector which is also mounted inside the reservoir and is actuated by a float.

In the vertical wall at the top of the reservoir is provided an opening 122; and on the wall opposite the opening is fixed externally a circular casing 123 of non-magnetic material. The casing 123 has a flange at one end (the end adjacent the wall) has a flat closure wall at the opposite end and its peripheral wall 124 is thin. Internally of the casing a pivot pin 125 is screwed to the flat end wall and on the pin is rotatably mounted a sleeve 126 to which are fixed a semi-circular or horse-shoe magnet 127 and a lever 128. The latter is cranked so as to pass through the opening 122 into the interior of the reservoir. It carries a float 129 within the reservoir. The pivot 125 is located in a vertical plane preferably passing through the axis of the casing and above the horizontal plane passing through the axis. The pivoting of the magnet 127 can thus bring the arms N and S alternately into contact with the thin peripheral wall 124. The lever 128 is positioned angularly in such a way that lifting of the float by the liquid inside the reservoir brings the N arm towards the wall 124 and moves the S arm away therefrom and that a lowering of the float produces the opposite effect. A pivot spindle 130 is screwed into the flange of the casing above the wall 124 in the vertical plane passing through the axis of said casing and an armature 131 is pivoted on the spindle 130 so as to embrace the upper part of the circular wall 124 whilst the two ends of said armature can touch this wall at the same level as points at which the magnet touches it. The armature 131 is provided with a pallet 132 insulated from the armature 131 and carrying at the further end and at the two faces contact points adapted to be applied alternatively against the fixed contacts 133 and 134 connected by conductors to the terminals 135 and 136 respectively. The plate 132 is itself connected to a terminal 137 by a suitable conductor.

As long as the level of liquid in the reservoir does not reach the float, the latter occupies its lowest position determined by the contact of the S pole with the peripheral wall 124, Fig. 10 of the casing. This S pole thus attracts the arm 131A of the armature which rocks about the pivot 130 and causes the pallet 132 to press against the terminal 133 so that current passes from the terminal 137 to the terminal 135 connected for example to the pump motor. When the float 129 is lifted by the liquid the S pole moves away from the wall 124 and the N pole approaches the wall and finally touches it as soon as the level reaches the desired height. At this moment the N pole attracts the arm 131B of the armature which tips so as to cause the plate 132 to move from the terminal 133 to the terminal 134. The pump stops and the current passes from the terminal 137 to the terminal 136 connected by a conductor to one of the points of the current connector 84 (Fig. 3) while the other point of the connector is connected to one pole of a source of current (not shown) and the other pole being connected to the terminal 137. In this position of the armature the circuit of the solenoid 80 is thus closed and the latter initiates the closure of the valves of the coupling in the manner already described.

For certain applications, for example, if it is desired to prevent sparking on opening of the contacts or if it is desired to obtain a relatively large contact surface, the reverser switch 132, 133 and 134 of Figs. 10 and 11 may be replaced by a mercury switch arranged in the manner shown in Fig. 12. In this case the armature 131 is extended by the provision of ring shaped supports 138 in which the switch tube 139 is secured, said switch having its contacts (a central contact and two end contacts) respectively connected to three terminals.

Fig. 13 shows another method of construction of an electric remote control device for the coupling more particularly for the filling of reservoirs from the top. An outer tube 140 arranged to form an extension of the connector, is provided at one end on the outer periphery with several radial claws 25 substantially like the claws 25 on the pipe or connector 12 so as to enable the tube 140 to be clamped to the present coupling device. The outer end of the tube is closed by a base provided with a central opening through which is passed a thin-walled inner tube 141 of nonmagnetic metal. The tube 141 is closed at the top but communicates with the outside by means of a small orifice 142 and a pipe 143 so that air can escape from the said tube. Lateral orifices 144 are cut in the lower part of the tube 140. A spherical float of anti-magnetic material 145 is freely guided in the tube 141 and the lower end of the said tube 141 is closed by a screen 146 the purpose of which is to prevent egress of the float from the tube while permitting entry of the liquid. This tube 141 passes into fluidtight casing 145A within the tube 140 to an extent substantially equal to the diameter of the float 145. Two relatively reversed bar magnets 147 are secured internally of the casing 145A and the lower poles of these magnets are disposed at the sides of the upper end of the tube 141. An armature 148 is articulated internally of the housing 145A a short distance above the magnets and a spring 149 tends to separate the armature from the upper poles of the magnets. The free end of the armature carries a contact element intended to co-operate with a fixed contact element. The two contact elements are connected by conductors to two connector terminals 150. One of these terminals is to be connected to one pin of the current connector box 84 (Fig. 3) while the other terminal is connected to one pole of the source of current not shown; the second terminal of the connector box 84 is connected to the other pole of the source of current.

Fig. 13 shows the position of the elements at the moment when the liquid introduced into the reservoir has reached the desired level. The float 145 occupies its highest position in which it is located between the lower poles of the magnet 147. As it is made of anti-magnetic material it cuts the flux between the lower poles of the magnets and thus breaks the magnet circuit. The upper poles of the magnets, therefore, no longer attract the armature 148 which is lifted by the spring 149 so that the two contact elements are pressed together and close the circuit of the solenoid 80 thus initiating the closure of the cut-off device of the coupling in the manner already described.

If the operator then withdraws the tube 140 from the reservoir by means of the coupling which is rigid with it so as to apply it to another reservoir the two tubes 140 and 141 empty and the float 145 falls until it rests on the screen 146. The magnetic flux is thus re-established between the lower poles of the magnets 147 so that the upper poles again attract the armature 148 to open the circuit. The operator after having introduced the tube 140 at the top of another reservoir to be filled may thus again open the cut-off device of the coupling and lock the handle 65 by the catch 76.

It should be understood that the methods of construction described are only intended to serve as examples, and other constructions can be designed without departing from the principle of the invention.

What I claim is:

1. A coupling with a cut-off device for connecting pipes with the fitting of any tank provided with a non-return valve, of the type embodying an attaching device designed to be applied to said fitting axially, engaged thereto by a partial rotary turn and fixed by axial clamping, comprising in combination a coupling case, an axial extension on said case, an abutment ring rigid with said axial extension; a sleeve slidably mounted on said case, a stirrup pivoted to said sleeve, slidably mounted on said axial extension of the case; a coupling handle pivoted to said stirrup, and a cam rigid with said coupling handle, arranged and adapted to co-operate with said case and abutment ring to produce an axial relative displacement between the case and the stirrup when said handle is rotated.

2. A coupling with a cut-off device for connecting pipes with the fitting of any tank provided with a non-return valve, of the type embodying an attaching device designed to be applied to said fitting axially, engaged thereto by a partial rotary turn and fixed by axial clamping, comprising in combination a coupling case, an oblique extension of said case forming a pipe, a bend between said case and said pipe, a flat seat perpendicular to the axis of the case on the outer side of said bend, a bore around said seat, concentric with said axis, a gear box fitted in said bore against said seat, a cover closing said gear box, a cylindrical outwardly directed extension of said cover forming a cup, an abutment ring fixed to said cup; a sleeve slidably mounted on said case, a stirrup pivoted to said sleeve, slidably mounted on said axial extension of the case; a coupling handle pivoted to said stirrup, and a cam rigid with said coupling handle, arranged and adapted to co-operate with said case and abutment ring to produce an axial relative displacement between the case and the stirrup when said handle is rotated.

3. The combination of claim 2 which comprises further one end of said stirrup shaped to form a jaw, said jaw being slidably and rotatably mounted on said cup, two diametrically opposed pivots provided on said jaw, a coupling handle having two arms mounted on said pivots, and a symmetrical cam rotationally rigid with one of said arms, said cam being interposed between said cover and abutment ring.

4. The combination of claim 3, wherein said cam is angularly locked in such a way that the depression and raising of the coupling handle has for its effect to respectively close and open the attaching device.

5. A coupling with a cut-off device for connecting pipes with the fitting of any tank provided with a non-return valve, of the type embodying an attaching device designed to be applied to said fitting axially, engaged thereto by a partial rotary turn and fixed by axial clamping, comprising in combination a coupling case, an axial extension on said case, an abutment ring rigid with said axial extension; a sleeve slidably mounted on said case, a stirrup pivoted to said sleeve, slidably mounted on said axial extension of the case; a coupling handle pivoted to said stirrup, said coupling handle having a transverse bar, a cam rigid with said coupling handle, arranged and adapted to co-operate with said case and abutment ring to produce an axial relative displacement between the case and the stirrup when said handle is rotated; and a spring catch carried by the stirrup, arranged and adapted to fit below said transverse bar when the latter is raised to open the coupling device, in such a way that the latter is held open.

6. A coupling with a cut-off device for connecting pipes with the fitting of any tank provided with a non-return valve of the type embodying an attaching device designed to be applied to said fitting axially, engaged thereto by a partial rotary turn and fixed by axial clamping, comprising in combination a coupling case, an oblique extension of said case forming a pipe, a bend between said case and said pipe, a flat seat perpendicular to the axis of the case on the outer side of said bend, a bore around said seat, concentric with said axis, a gear box fitted in said bore against said seat, a cylindrical outwardly directed extension of said gear box forming a slider, a piston slidably mounted on said slider forming the valve of said cut-off device, a pilot valve adapted to co-operate with the base of said piston so as to carry the later in the two directions, a cover closing said gear box, a cylindrical outwardly directed extension of said cover forming a cup, an abutment ring fixed to said cup; a sleeve slidably mounted on said case, a stirrup pivoted to said sleeve, slidably mounted on said axial extension of the case; a coupling handle pivoted to said stirrup, and a cam rigid with said coupling handle, arranged and adapted to co-operate with said case and abutment ring to produce an axial relative displacement between the case and the stirrup when said handle is rotated.

7. The combination of claim 6, wherein said gear box comprises a guide way, said pilot valve is rigid with a tubular rod slidably mounted in said guide way, and a rack is provided on said rod.

8. The combination of claim 6, wherein said gear box comprises a guide way, said pilot valve is rigid with a tubular rod slidably mounted in said guide way and provided with a rack, a central rod having a rack is slidably mounted in said tubular rod and adapted to control the non-return valve of said fitting.

9. The combination of claim 8, wherein each rack of said two rods engage one pinion in the gear box, said pinions engage a common pinion in said gear box, and a control handle for the cut-off device is rotatably rigid with said common pinion.

10. The combination of claim 9 which comprises further a ring having a notch rigidly fixed to said control handle externally of said gear box, a peripheral groove provided on the sleeve, a connecting rod having a slide, in engagement with said peripheral groove, arranged to slide axially on the gear box, a lug provided on said slide of the connecting rod, said lug and notch being arranged and adapted to cooperate to prevent sliding of the sleeve when the cut-off device is open and to prevent rotation of the control handle when the coupling device is open.

References Cited in the file of this patent

UNITED STATES PATENTS

| | | |
|---|---|---|
| 1,322,076 | Wheaton | Nov. 18, 1919 |
| 1,911,987 | Casey | May 30, 1933 |
| 2,333,455 | Warren | Nov. 2, 1943 |
| 2,384,628 | Krone | Sept. 11, 1945 |
| 2,548,368 | Hartley | Apr. 10, 1951 |
| 2,557,378 | Granberg | June 19, 1951 |
| 2,646,817 | Cox | July 28, 1953 |
| 2,653,832 | Carter | Sept. 29, 1953 |